Jan. 26, 1954    H. C. MEAD ET AL    2,667,572
TAIL LAMP LENS

Original Filed Feb. 21, 1949    2 Sheets-Sheet 1

Inventors
Howard C. Mead &
George W. Onksen, Jr.
By Spencer, Willets, Helwig Bailie
Attorneys

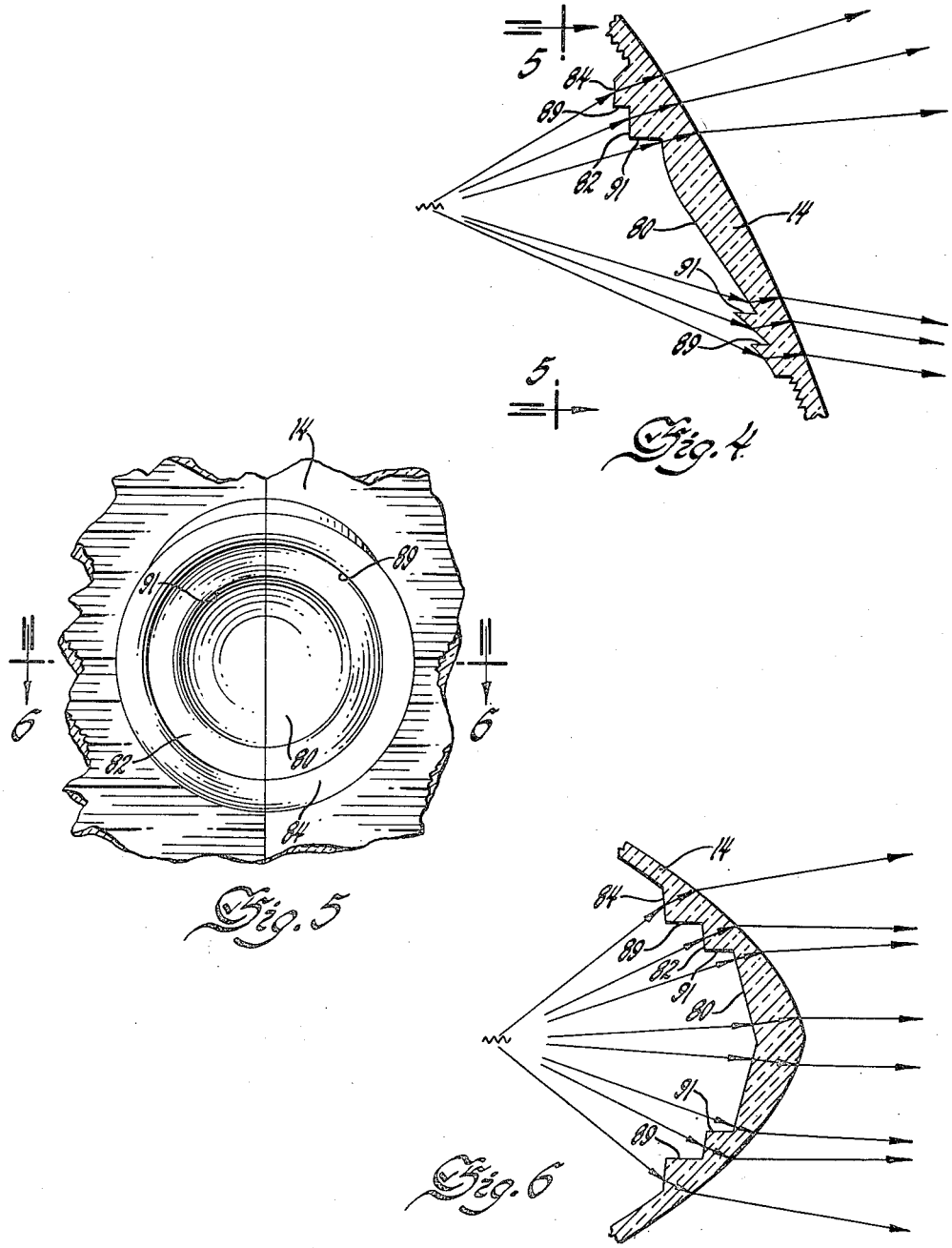

UNITED STATES PATENT OFFICE 2,667,572

TAIL LAMP LENS

Howard C. Mead and George W. Onksen, Jr., Anderson, Ind., assignors to General Motors Corporation, Detroit, Mich., a corporation of Delaware Original application February 21, 1949, Serial No. 77,494. Divided and this application March 1, 1950, Serial No. 157,983

1 Claim. (Cl. 240—106)

It is an object of the present invention to provide an improved automobile tail lamp and fuel tank inlet cover assembly.

It is another object to provide an automobile tail lamp and cover assembly having means to support the assembly in an opening in the body structure with an external surface of the lamp forming a continuous part of surface of the body and having a movably mounted lamp housing serving to conceal the fuel tank inlet so it will not detract from the streamline contour of the body.

Still another object is to provide a tail lamp lens having suitable light directing characteristics while having an external surface designed to form a part of a continuous streamlined body surface.

Further objects and advantages of the invention will become apparent as the following description proceeds and the features of novelty which characterize the invention will be pointed out with particularity in the claim annexed to and forming a part of this specification.

Figure 1:
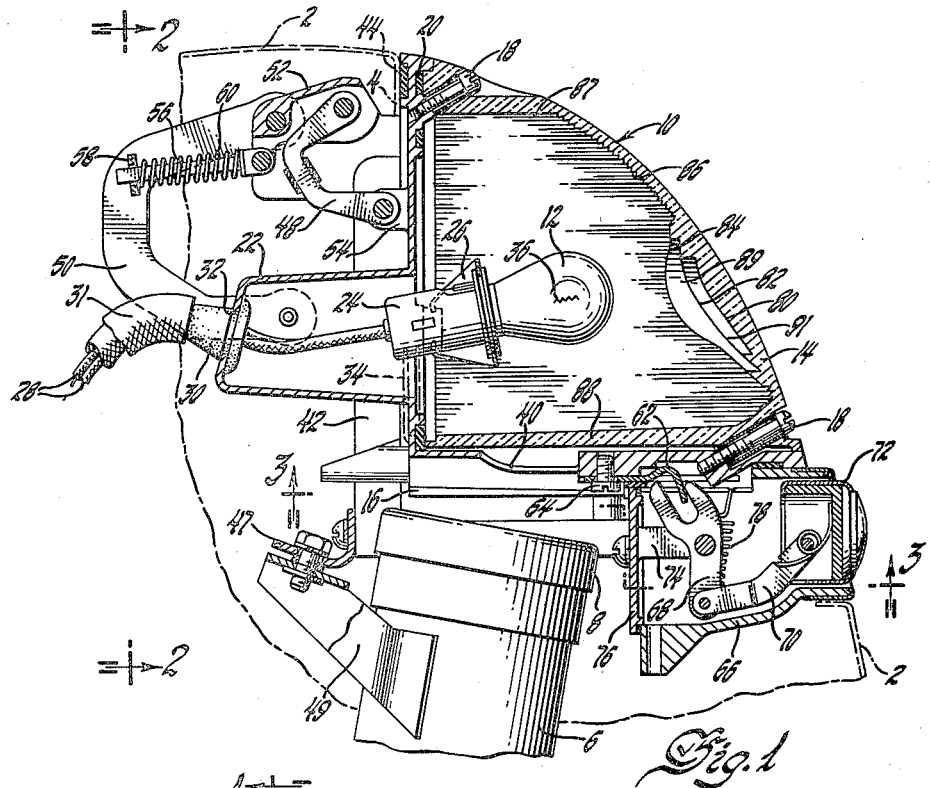
Figure 2:
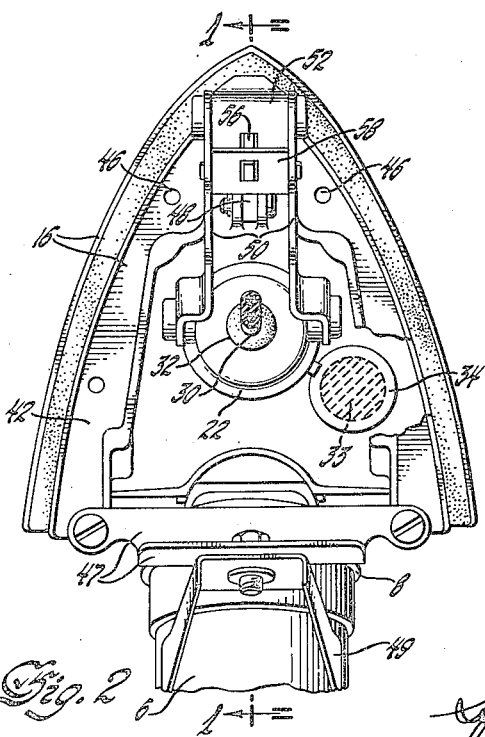
Figure 3:
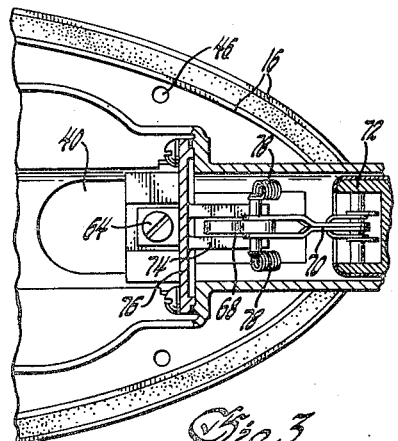

For a better understanding of the invention, reference may be had to the accompanying drawings in which Figure 1 is a view taken along the line 1—1 of Figure 2 illustrating the tail lamp and cover assembly embodying the present invention mounted in the rear fender of an automobile adjacent the fuel inlet; Figure 2 is a view taken along the line 2—2 of Figure 1; Figure 3 is a view taken along the line 3—3 of Figure 1; Figure 4 is a partial view in section and partly broken away of the tail lamp signalling lens; Figure 5 is a view taken along the line 5—5 of Figure 4 and Figure 6 is a view taken along the line 6—6 of Figure 5.

Referring now to the drawings and particularly to Figures 1 to 3, there is illustrated a rear portion 2 of an automobile with an opening 4 of sufficient size and location to provide convenient access to the fuel tank inlet pipe 6. While the opening may be located in any convenient part of the body structure, it is preferred that the inlet pipe be located so that access to the pipe is obtained through an opening in the fender structure. A removable cap 8 is provided for closing the inlet pipe and its details of construction along with the inlet pipe 6 being well known need not be described here in detail.

Pivotally mounted in the opening 4 is a housing 10 adapted to house an electric lamp 12 and provide a cover for the inlet pipe 6 of the fuel tank. The housing comprises a lens 14 and a support 16 to which the lens is attached by threaded members 18. To provide for sealing the interior of the housing against the admission of water, a gasket 20 is interposed between the lens and the upwardly extending wall of the support.

The support 16 is formed with perpendicularly disposed walls, the external edges of which are arched to conform to the fender contours defined by the opening 4. The upwardly extending wall of the support is provided with an integral enclosure 22 extending oppositely of the supported lens 14 in which a lamp socket 24 is partially recessed. The lamp socket is mounted in the housing by a bracket 26 which is resiliently secured to the upwardly extending wall of the support on opposite sides of enclosure 22 by threaded members, not shown. An electrical circuit to the lamp 12 is established by lead-in wires 28 connected to the terminals of the lamp socket and entering the enclosure 22 through a rubber grommet 30 disposed in an aperture 32 in the end of the enclosure. The rubber grommet is adapted to be recessed in the cable sheath 31 surrounding the lead-in wires to prevent the introduction of moisture to the interior of the sheath and in addition forms a seal in the aperture 32 to make the interior of the housing 10 substantially weatherproof. Adjacent the enclosure 22 and offset from the vertical plane bisecting the housing and support, the upwardly extending wall of support 16 is provided with an aperture 33 in which a light directing lens is positioned. The lens 34 is provided to direct light from the lamp 12 onto the gasoline tank inlet pipe 6 when the pipe is uncovered and the housing is in the open position. As the lens is offset from the housing vertical midplane in which the source of light from filament 36 of the lamp 12 is located, parallel light bending formations are formed on one surface of the lens 34 to bend the light to illuminate the pipe 6 when the housing is in the open position. As it is considered desirable that a lamp adapted to serve as a gasoline inlet cover be provided with auxiliary signal means when the lamp housing is in the open position, the support 16 is provided with an aperture 40 which permits light to be directed through the aperture and rearwardly of the lamp when the inlet pipe is uncovered.

The lamp housing 10 is supported in the opening 4 by a frame member 42 attached to the inturned fender edges 44 outlining the fender opening 4. The frame member 42 is a die casting formed with perpendicularly disposed arched frames similar in form to the arched walls of support 16 and provided with bolt holes 46 for securing the frame to the inturned edges 44 of the fender opening. To provide additional support for the inlet pipe 6 in the fender opening, a support frame 49 welded to the inlet pipe is connected as shown in Figs. 1 to 3 by an angle bar 47 to the frame member 42. To provide for movement of the housing 10 to uncover the inlet pipe 6, the support 16 is pivotally connected to the frame member 42 by a hinge consisting of a connecting link 48 and a pair of parallel connecting links 50 shown connected respectively at their opposite ends to a flange 52 attached to the frame member 42 and the enclosure 22 and an ear 54 attached to the support 16. With the hinging links connected to the frame member 42 and support 16 in the manner shown and described, the movement of the lamp housing 10 to its open position is simultaneously outwardly and upwardly of the fender opening. To provide a restraining force for maintaining the housing at the extreme ends of its angular movement an overcenter spring mechanism is connected between the flange 52 and the parallel hinging links 50. The mechanism consists of a rod 56 pivotally connected at one end to the flange 52 and slidably connected at its other end to a yoke bar 58 extending between the parallel links 50. To provide an overcenter spring action, a compressed helical spring 60 is mounted on the rod 56 between the yoke bar 58 and the point of connection with the flange 52. With the housing in its position illustrated in Figure 1 the force of the spring acts on the yoke bar 58, to rotate the bar, links and housing about the connecting points on the flange 52 in a clockwise direction. As the housing is moved angularly from its closed position in a counterclockwise direction the direction of force acting on the housing is reversed due to the action of the overcenter mechanism and the force acts to move the housing counterclockwise to its open position. In moving the housing from its open to its closed position the action of the overcenter mechanism is similar, providing a restraining force against clockwise movement initially and subsequently a force aiding clockwise movement to the closed position.

The lamp housing is provided with a striker plate 62 adapted to cooperate with an overcenter latching mechanism to lock the lamp housing in its closed position or initiate a counterclockwise movement of the housing when it is desired to uncover the inlet pipe 6. The striker plate 62 is attached to the support 16 by a threaded member 64. The latching mechanism is enclosed in a housing 66 formed integrally with the frame member 42 and comprises a latch member 68 and a link 70 connected at one end to the latch member 68 and at its opposite end to a push button 72 slidably mounted in one end of the housing 66. The latch member 68 is provided with a bifurcated end for engaging the striker plate and is pivotally mounted at substantially its midpoint to a pair of arms 74 extending from the side of a cover plate 76 attached to the other end of the housing 66. To provide an overcenter spring action for the latching member 68, a pair of springs 78 are connected between the wall of enclosure 66 and the junction of latch member 68 and link 70, as shown.

With a latching mechanism such as that shown and described, an inward movement of the push button 72 is transformed through link 70 to impart a clockwise rotary movement to latching member 68 against the restraining force of springs 78. As the bifurcated end of the latching member moves clockwise its left-hand arm engages the striker plate forcing the lamp housing upwardly to permit the grasping of the housing edge for further movement to the open position. With a continuation of the clockwise movement of the latching member the force of springs 78 is first neutralized and then its direction is reversed to impart a force aiding clockwise rotation of the latching member until the connected end of the member strikes the plate 76 and is stopped. To move the housing to its closed position the housing is moved into the recess until the striker plate engages the left-hand arm of the bifurcated end. Continued movement of the housing to its closed position rotates the latching member counterclockwise against the restraining force of springs 78 until the connected end of the latching member is moved sufficiently to neutralize and reverse the direction of the restraining force. Thereafter the counterclockwise movement of the latching member is aided by the force of the springs 78 and the right-hand arm of the bifurcated end engages the striker plate forcing the housing to its closed position. With the housing in the closed position the force of the springs 78 acts to lock the housing in this position.

As illustrated in Figures 1 to 3 of the drawings the lens 14 is formed with an unsymmetrical shape in the vertical plane and a symmetrical shape in a plane substantially 90° disposed to it or in the horizontal plane so that the external surface of the lens will conform to the contour of the fender. In addition, the internal surface contour conforms generally to the external surface contour. With such surfaces being asymmetrical with respect to the focal axis of the lens the lens would not normally act to collimate the light rays from the filament source 36 of the lamp and the optical efficiency of the lamp as a signalling means would be unsatisfactory. Accordingly the lens is formed with a light collimating area surrounding the focal axis, see Figure 5, comprising the central dioptric condensing button 80 and the concentric dioptric condensing rings 82 and 84. As seen in the horizontal section in Figure 6 the light collimating area comprises two curved surfaces formed about different centers, one on each side of the vertical axis of the lens so that the inner surface of the light collimating area will be in dioptric agreement with the particular curve of the external surface formed at the nose of the lens. As seen in the vertical section in Figure 4 the internal surface of the light collimating area is formed on different radii along the vertical axis of the lens so that the surface will also be in dioptric agreement with the vertical projection of the unsymmetrical external surface. While the surfaces of the rings 82 and 84 are stepped with respect to the central button 80 it will be understood that they are formed in this manner because the section of the lens does not permit the forming of an unbroken surface. Surrounding the light collimating area the internal surface of the lens 14 is formed with horizontal flutes 86 which diffuse light from the lamp source and are primarily for decoration purposes.

The internal surfaces of the lens 14 is formed by a male plunger provided with a removable plug having its exposed end formed to mold the light collimating surface hereinabove described. In this connection the plug comprises a pair of concentric cylinders adapted to form the rings 82 and 84 and a central concentric plug adapted to form the button 80.

The internal surface of the lens 14 which is formed by the male plunger, the pair of concentric cylinders, and the central concentric plug, comprises draft surfaces 87 and 88 along the upper and lower walls of the body comprising the lens 14, the parallel horizontal fluted surfaces 86, the light collimating surfaces 84, 82 and 80 and the continuous annular surfaces 89 and 91 joining the light collimating surfaces referred to. The draft surfaces 87 and 88 are formed by slightly tapering upper and lower parts of the male plunger while the draft surfaces 89 and 91 are formed by continuous parts of the exterior surfaces of the concentric plug and the inner one of the concentric cylinders adjacent the extreme outer ends of the plug and inner concentric cylinder. The surfaces 84, 82 and 80 are formed by the extreme outer ends of the outer and inner concentric cylinders and concentric plug, all respectively. All of the draft surfaces referred to are formed around the focal axis of the lens 40 in such manner that the plunger, the concentric cylinders and the concentric plug can be withdrawn from the transparent body forming the lens 14.

While the embodiment of the present invention as herein disclosed, constitutes a preferred form, it is to be understood that other forms might be adapted, all coming within the scope of the claim which follows.

What we claim as new and desire to secure by Letters Patent of the United States is:

A lens body comprising an external surface which is asymmetrical with respect to a focal axis in a vertical plane through said lens and axis, and an inner surface which is formed by a plurality of continuously curved light collimating surfaces concentrically disposed about said axis and by continuously curved annular connecting surface means, each of said plurality of curved surfaces being formed by surface elements intersecting said axis at different places along said axis, each of said curved surfaces having varying radii of curvature relative to the focal axis, a centrally disposed button surrounded by said continuously curved surface means and said annular connecting surface means, said annular connecting surface means being formed between said plurality of surfaces and having the surface elements thereof extending substantially in parallel relation to said focal axis, said plurality of curved surfaces and and said external surface being in dioptric agreement to collimate light from a point source on said focal axis.

HOWARD C. MEAD.
GEORGE W. ONKSEN, Jr.

References Cited in the file of this patent

UNITED STATES PATENTS

| Number | Name | Date |
|---|---|---|
| D. 112,463 | Levy | Dec. 6, 1938 |
| 1,955,597 | Lamblin-Parent | Apr. 17, 1934 |
| 2,328,329 | Dickson | Aug. 31, 1943 |